May 20, 1941.　　　F. C. LEONARD　　　2,242,649
THERMOSTATIC REGULATOR
Original Filed May 14, 1931　　2 Sheets-Sheet 1
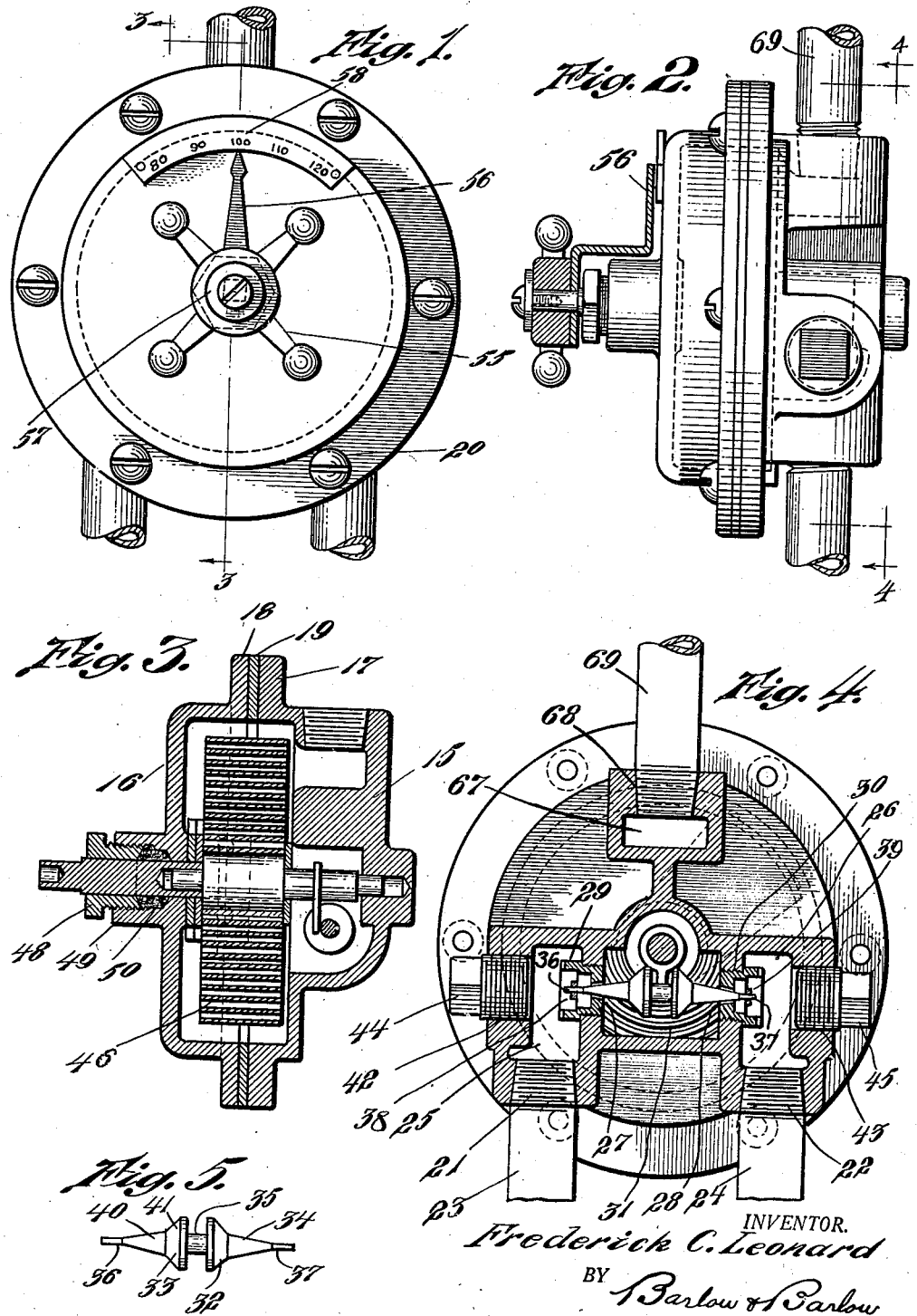
INVENTOR.
Frederick C. Leonard
BY Barlow & Barlow
ATTORNEYS.

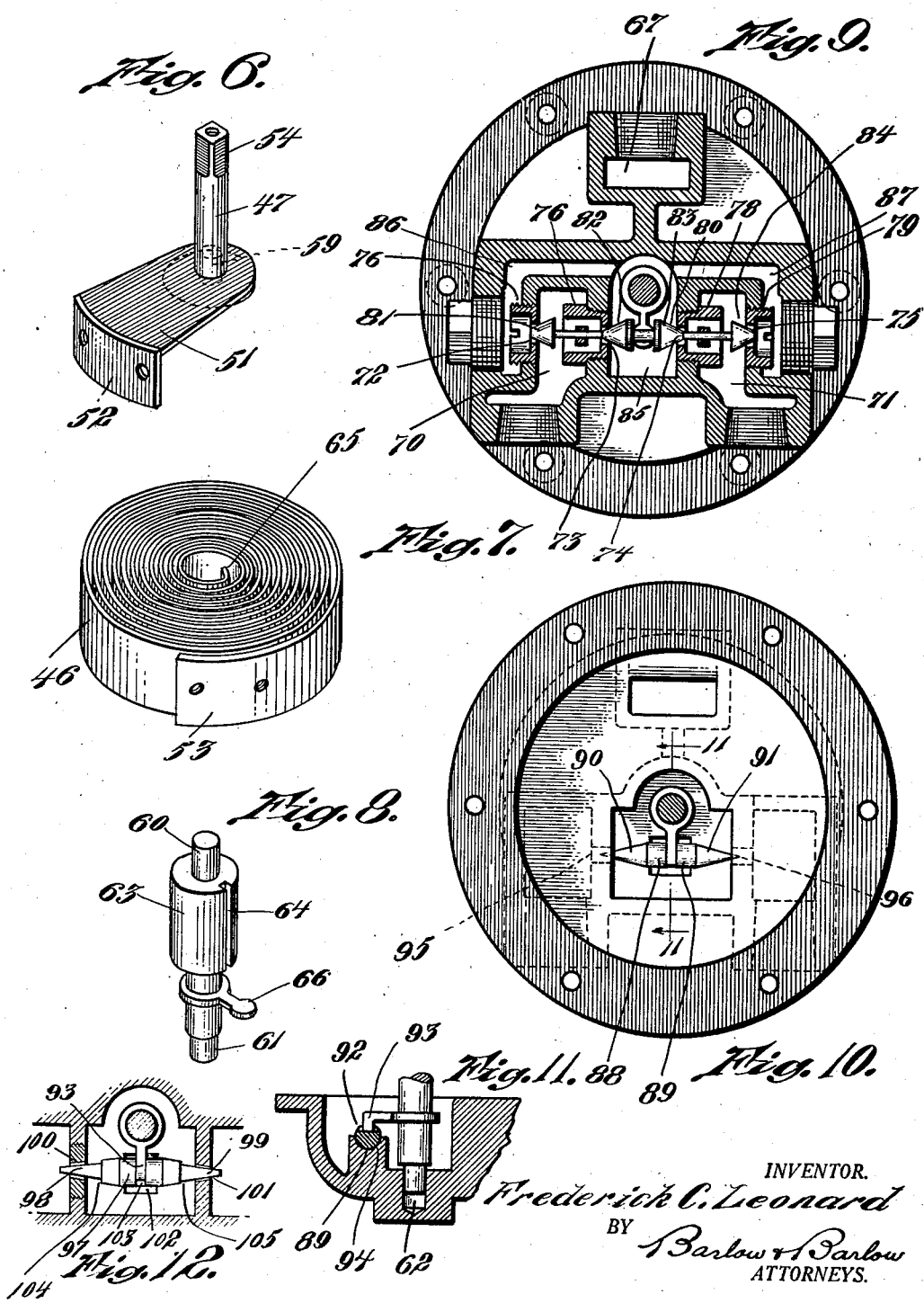

Patented May 20, 1941

2,242,649

UNITED STATES PATENT OFFICE 2,242,649

THERMOSTATIC REGULATOR

Frederick C. Leonard, Cranston, R. I.

Application May 14, 1931, Serial No. 537,285
Renewed June 4, 1936

9 Claims. (Cl. 236—12)

My present invention relates to thermostatic regulators and has particular reference to regulators for maintaining a desired temperature of flowing water.

In the field of thermostatic control a problem of ever increasing importance is that of providing an accurate regulator for controlling the temperatures of fluid flows of small volume. The existence of this problem may be said to be due to four major reasons; first, the difficulty incident to friction of the moving parts, this friction increasing per unit area of contacting surfaces as the size of the moving parts decreases; second, the decreasing strength of the thermostatic element as its size decreases; third, the difficulty in providing a control by the thermostatic element that will regulate the flow in exact proportion to the temperature changes; and fourth, the necessity for eliminating surging. A further difficulty of substantial effect resides in the need for compensating for any substantial difference in the pressures of the hot and of the cold medium.

The principal object of my invention is therefore to devise a thermostatic regulator of small size, suitable for fluid flows of small volume, that will accurately control the temperature of the flowing fluid within the operating range of the regulator.

It is well established that a decrease in the size of the moving parts of a thermostatic mixing valve will increase the relative area of the contacting surfaces and thus increase the relative frictional engagement between the moving parts. This practical effect eliminates the use of either sliding or rotating flow control valves and restricts the type of control valve to the reciprocating poppet form, as this type does not slidingly engage with its seat to increase or decrease the flow volume. Another object of my invention is therefore to devise a poppet type valve construction which may be utilized in a small flow thermostatic regulator, and will not increase the friction above commercial limits during use.

The reduction of the total actual friction compensates to some extent for the decreased strength of the necessarily smaller thermostatic elements and additional compensation may be obtained by so mounting the thermostatic element that the element is not constrained when the desired temperature is maintained, but is placed under operative strain whenever the temperature rises above or drops below the desired value. A further object of my invention is therefore to mount a thermostatic element or elements and provide a setting mechanism therefor, whereby the thermostatic element is in equilibrium when subjected to the set temperature.

This preferred mounting of the thermostatic element facilitates a more exact control of the temperature regulator, as the element is maintained in unconstrained position as long as it is subjected to the set temperature and therefore varies or shifts in exact accord with any change in temperature from the set value. Thus, a slight change from set value either above or below, will produce an immediate effect on the thermostatic elements and an immediate movement of the control valve, thus providing a very exact temperature control.

Because of the necessarily small size of the parts in a small flow regulator, the tendency for surging is normally increased unless some damping means are provided. Instead of adding such damping means, it has been found that surging is eliminated, if a thorough mixing of the hot and cold fluids prior to their contacting with the thermostatic element is obtained, and if the available flow space in and around the thermostatic element is reduced to the minimum; this construction apparently eliminates surging by preventing local hot and cold stream contacts with the thermostatic element and by reducing and substantially eliminating local flow disturbances. It is therefore an additional object of my invention to so design the thermostatic parts as to eliminate surging.

The pressure of the hot and cold fluids, if very different, may tend to move the valve parts and thus prevent accurate correspondence between the set temperature and the flow temperature actually obtained. This effect is generally small for ordinarily flow conditions and may be disregarded for regulators which do not require extremely accurate temperature control; it has been found practical, however, to provide a balanced valve construction that will compensate for abnormal pressure variations. Another object of my invention is therefore to devise a modified construction that retains all the advantages of the standard type and adds the further feature of balancing the valve parts and thus neutralizing the effects of flow pressure inequalities.

With these and other objects and advantageous features in view, my invention consists of a novel method of operation and a novel arrangement of parts more fully disclosed in the detailed description following, in conjunction with the accompanying drawings, and more particularly defined in the claims appended hereto.

In the drawings:

Fig. 1 is a front view of my improved small flow thermostatic regulator.

Fig. 2 is a side view thereof.

Fig. 3 is a section on the line 3—3 of Fig. 1.

Fig. 4 is a section on the line 4—4 of Fig. 2.

Fig. 5 is a view of the valve.

Fig. 6 is a perspective view of the seating shaft and its associated thermostatic engaging parts.

Fig. 7 is a perspective view of the thermostat.

Fig. 8 is a perspective view of the valve operating mechanism.

Fig. 9 is a view similar to Fig. 4, showing a modified form of valve construction.

Fig. 10 is a view somewhat similar to Fig. 9 but showing a further modified form of valve.

Fig. 11 is a section on the line 11—11 of Fig. 10 showing the mechanism for operating the modified valve construction; and Fig. 12 is a view, partly in section, of a further modified form.

Referring to the drawings, the improved regulator comprises a back member 15 containing the fluid inlet and outlet ducts and housing the valve mechanism, and preferably cast of brass, and a front member 16 housing the thermostatic element, the setting mechanism, and the valve operating mechanism, and preferably also cast of brass. The back and front members respectively have machined flanges 17, 18 between which a packing 19 may be inserted, the two flanges and the packing being secured together by screws 20 or the like which pass through suitable openings in the flange 18 and screw threadedly or otherwise engage the flange 17.

As shown in Fig. 4, the back member has two inlets 21, 22 threaded to receive the correspondingly threaded ends 23, 24 of inlet conduits for fluids of different temperatures. The incoming fluids enter valve chambers 25, 26 and pass through conical ports 27, 28 in bushings 29, 30, these bushings being secured as by threading in the opposite walls of a fluid mixing chamber 31.

The flow areas of the ports are controlled by valve mechanism, which as illustrated includes a valve device 32 which has two oppositely faced valves 33, 34 connected by a central bar 35, the ends of the valves extending outwardly as guide stems 36, 37 which are slidably received in spiders 38, 39 of the bushings 29 and 30. The seating face of each valve is preferably of the double conical type, indicated at 40, 41 in Fig. 5, and the back face of each valve is preferably plane, to provide suitable engaging areas for the valve operating means hereinafter described. The insertion of the bushing and the valve is facilitated by providing aligned openings 42, 43 in the back member which are normally closed by studs 44, 45 which screw threadedly engage the aligned openings.

Referring now to Figs. 1 and 3, the front member is cup-shaped to house the thermostatic element 46, this element being formed as a spiral coil, see Fig. 7. An operating shaft 47 is rotatably mounted in a central bushing 48 which is screw threadedly seated in an upstanding position in a flanged portion 49 of the port member, with the shaft packing 50 locked therebetween. The shaft 47 has a radial plate 51 and a depending lip 52 preferably formed integral therewith, but which may be rigidly secured thereto, the lip 52 being locked to the outer end of the thermostatic element 46 as by screws passing through aligned openings. The upper end of the shaft is squared, as indicated at 54, to receive a correspondingly bored handle 55, a pointer element 56 being also mounted in the square end and held in place with the handle by the usual lock screw 57. A temperature scale 58 is fixed on the front member to cooperate with the end of the pointer element.

Referring now to Figs. 6 and 8, the lower end of the operating shaft 47 is recessed as at 59 to receive the upper end of the valve actuating rod 60, the lower end 61 of the valve actuating rod being received in a suitable recess, such as indicated at 62 in Fig. 11, in the back member. Preferably, the valve actuating rod is stepped at its lower end, to seat on the back member. The rod 61 has an upper cylindrical portion 63 provided with a vertical slot 64 to receive the inturned inner end 65 of the thermostatic element, and has a finger element 66 adapted to rest between the two plane back faces of the valves 33, 34 in adjacency to the valve bar 35.

The water which flows into the thermostatic cup flows out through an outlet chamber 67, see Fig. 4, which is provided with a screw threaded opening 68 for detachably receiving the end of the outlet conduit 69.

Referring to Figs. 1, 3, and 4, the operation of the novel small flow thermostatic element may now be explained:

The handle 55 is first manually turned to bring the pointer 56 opposite the desired temperature setting on the scale 58; at this setting the thermostatic element assumes a position such that it would be without strain if the temperature of the surrounding fluid was the same as the setting. The hot and cold water streams entering into the chambers 25, 26 pass through the valve controlled port areas and are forced into opposed conical sheets by the valve elements, these sheets intermingling and mixing thoroughly in the mixing chamber 31 to form a thoroughly mixed fluid which passes forwardly through the thermostatic element 46, between the convolutions. The long conical valve portions 34 and 40 permit very close regulation, and the conical portions 32 and 41 serve to spread the water and also function as stop valves when shifted to engage the conical ports 27 and 28. As will be noted from Fig. 3, the available flow space is restricted to the minimum space possible, thus forcing the thoroughly mixed fluid to pass through the convolutions and back to outlet chamber 67 and the outlet conduit 69 without local eddies or disturbances.

If the temperature of the mixture is not the same as the set temperature, the thermostatic element expands or contracts in the usual fashion, thus shifting the valve mechanism 32 by means of the finger 66. The conical formation of the two elements, the thorough immediate mixing, and the limited flow space, result in an instant response to the slightest variation in temperature, and thus tend to maintain a steady, rapid, non-surging regulation.

Where the pressures of the hot and cold fluids differ greatly, or where they fluctuate widely, a construction such as shown in Fig. 9 is preferred. In this form, each inlet chamber 70, 71 has two outlet ports, these being respectively designated 72, 73, and 74, 75, provided in bushings 76, 77, 78 and 79 which are screw threadedly secured in aligned position in the back member, the associated valve device 80 having four aligned valves 81, 82, 83 and 84 with the inner valves 82, 83 controlling the ports 73, 74 which lead to the mixing chamber 85, and the outer valves 81, 84 controlling the ports 72, 75 which lead to the communication ducts 86, 87 also in open communication with the mixing chamber 85. This construction balances the flow to the mixing chamber, and therefore controls the flow areas independently of fluid pressure differences or variations.

A further modification, suitable for use when the regulation is to be very accurate, is illustrated in Figs. 10 and 11. In this form, the valve device designated as 88 has a central cylindrical portion 89 and two conical ends 90, 91, the portion 89 having a slot 92 into which the downwardly bent actuating finger 93 seats, the portion 89 being supported in a saddle 94 of arcuate form provided in the back member. This construction permits complete full opening of the inlet ports 95, 96, and also minimizes friction, as the valve device weighs very little and consequently can exert very little pressure in the support saddle 94.

A further modified form of valve mechanism is illustrated in Fig. 12. This form is similar in general appearance to that shown in Figs. 10 and 11, and includes a valve device 97 having oppositely disposed conical valves 98, 99 which cooperate with conical flow ports 100, 101. The valve device is slidably mounted in an arcuate saddle 102, and has a slot 103, into which the actuating finger 93 seats. Stop shoulders 104, 105 are provided for the valves, these shoulders engaging the ports 100 and 101 to produce complete port closure. The described construction provides a very accurate flow control, and also produces a balanced effect, as the stop shoulders serve as reaction abutments and thus compensate for increased pressure on whichever valve is at closing position. If desired, these shoulders may be slightly arcuate or stepped to assist in obtaining the desired reactive effect.

The described regulator mechanisms are therefore simple in construction, accurate in operation for relatively small flows, and are self-damping, thus eliminating surging.

While I have described specific embodiments of my invention, it is obvious that changes in the design, the proportions, and the arrangement of the parts may be made to suit particular or special requirements for thermostatic regulators, without departing from the spirit or the scope of the invention as defined in the appended claims.

I claim:

1. In a thermostatic regulator, a back member having a mixing chamber, inlets for conveying a hot and a cold fluid to said mixing chamber, valve mechanism in said mixing chamber controlling said inlets and directing the flow of fluid from said inlets in axially aligned opposed directions, and an outlet for mixed fluid; in combination with a front member having a thermostatic chamber, a thermostat therein, and a control device secured to said thermostat and operatively associated with said valve mechanism; said members being secured together to place said thermostatic member in communication with said mixing chamber and said outlet.

2. In a thermostatic regulator, a back member having a mixing chamber, inlets for conveying a hot and a cold fluid to said mixing chamber, balanced valve mechanism in said mixing chamber for controlling said inlets and for directing the flow of the fluids therefrom in axially aligned opposed directions, an outlet from said chamber for mixed fluid, and a front member having a separate thermostat chamber, a thermostat therein, and a control device secured to said thermostat and operatively associated with said valve mechanism, said members being secured together to place said thermostat chamber in communication with said mixng chamber and said outlet.

3. In a thermostatic regulator, a mixing chamber, opposed inlets for conducting hot and cold fluid to said mixing chamber, a valve device comprising two valves of conical form and oppositely directed towards the said opposed inlets, said valves being joined by a portion slidably mounted in said mixing chamber said portion being provided with spaced abutment surfaces, and thermostatically controlled means between said surfaces to selectively exert pressure against either surface for shifting said valve device to increase one inlet area and simultaneously decrease the other inlet area.

4. In a thermostatic regulator, a mixing chamber, opposed inlets for conducting hot and cold fluid to said mixing chamber, a valve device comprising two valves of conical form and oppositely directed towards the said opposed inlets, said valves being joined by a portion, a support saddle in said mixing chamber slidably supporting said portion, and thermostatically controlled means for shifting said valve device to increase one inlet area and simultaneously decrease the other inlet area.

5. In a thermostatic regulator having a mixed fluid outlet, a mixing chamber, inlet conduits including inlet ports for conducting a hot and a cold fluid to the mixing chamber, a slide valve having parts cooperating with said inlet ports and reciprocatable to increase flow through one inlet port and to simultaneously decrease flow through the other inlet port, a thermostatic chamber communicating with said mixing chamber, thermostatic coil means having spiral convolutions and mounted therein, means for selectively adjusting the position of one end of said coil means, and a universally jointed connection between the other end of said coil means and said slide valve.

6. In a thermostatic regulator, a mixing chamber, inlets for conveying a hot and a cold fluid to said mixing chamber, valve mechanism controlling said inlets, a thermostatic chamber, thermostatic coil means in said chamber operatively associated with said valve mechanism, and an outflow chamber, said outflow chamber being adjacent said mixing chamber but separated therefrom by a partition and said thermostatic chamber extending over said mixing and said outflow chambers and said partition and freely communicating with said mixing and outflow chambers, said coil means also extending over said mixing and said outflow chambers and said partition, whereby fluid flowing from said mixing chamber to said outlet chamber passes through said coil means.

7. In a thermostatic regulator, a housing, a mixing chamber in said housing, inlet conduits including inlet ports for conveying a hot and a cold fluid to said mixing chamber, a slide valve having parts cooperating with said inlet ports and reciprocatable to increase flow through one inlet port and to simultaneously decrease flow through the other inlet port, a thermostatic chamber in said housing, thermostatic coil means having spiral convolutions and mounted in said thermostatic chamber, means for selectively adjusting the position of one end of said coil means, a universally jointed connection between the other end of said coil means and said slide valve, and an outflow chamber in said housing, said thermostatic chamber being in free communication with said mixing and outflow chambers.

8. In a thermostatic regulator, a housing, a mixing chamber in said housing, inlet conduits including inlet ports for conveying a hot and a cold fluid to said mixing chamber, a slide valve having parts cooperating with said inlet ports and reciprocatable to increase flow through one inlet port and to simultaneously decrease flow through the other inlet port, a thermostatic chamber in said housing, thermostatic coil means having spiral convolutions and mounted in said thermostatic chamber, means for selectively adjusting the position of one end of said coil means, a universally jointed connection between the other end of said coil means and said slide valve, and an outflow chamber in said housing, spaced from said mixing chamber, said thermostatic chamber being in free communication with said mixing and outflow chambers.

9. In a thermostatic regulator, a housing, a mixing chamber in said housing, inlet conduits including inlet ports for conveying a hot and a cold fluid to said mixing chamber, a slide valve having parts cooperating with said inlet ports and reciprocatable to increase flow through one inlet port and to simultaneously decrease flow through the other inlet port, a thermostatic chamber in said housing, thermostatic coil means having spiral convolutions and mounted in said thermostatic chamber, means for selectively adjusting the position of one end of said coil means, a universally jointed connection between the other end of said coil means and said slide valve, and an outflow chamber in said housing, spaced from said mixing chamber, said thermostatic chamber being positioned in the path of flow of mixed fluid from the mixing chamber to the outflow chamber and being in free communication with said mixing and outflow chambers.

FREDERICK C. LEONARD.